US008107966B2

(12) United States Patent
Choi et al.

(10) Patent No.: US 8,107,966 B2
(45) Date of Patent: Jan. 31, 2012

(54) COGNITIVE RADIO COMMUNICATION METHOD USING DYNAMICALLY ALLOCATED COMMON CONTROL CHANNEL INFORMATION

(75) Inventors: Hyun Ho Choi, Suwon-si (KR); Kyung Hun Jang, Suwon-si (KR); Youngsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 12/400,073

(22) Filed: Mar. 9, 2009

(65) Prior Publication Data
US 2010/0093360 A1    Apr. 15, 2010

(30) Foreign Application Priority Data
Oct. 10, 2008  (KR) ................. 10-2008-0099797

(51) Int. Cl.
*H04W 72/00* (2009.01)
(52) U.S. Cl. ..... 455/450; 455/446; 455/451; 455/452.1; 455/452.2; 455/453; 455/434; 455/509; 455/67.11; 370/328; 370/329; 370/462; 370/478; 370/480; 370/447
(58) Field of Classification Search .......... 455/446, 455/447, 450, 451, 452.1, 452.2, 453, 509, 455/67.11, 434, 68; 370/252, 254, 328, 329, 370/444, 447, 461, 462, 478, 480
See application file for complete search history.

(56) References Cited

U.S. PATENT DOCUMENTS
6,385,434 B1* 5/2002 Chuprun et al. ............. 455/11.1
7,710,919 B2* 5/2010 Woo et al. ...................... 370/329
2008/0130519 A1* 6/2008 Bahl et al. ....................... 370/254
2008/0205352 A1* 8/2008 Chu et al. ......................... 370/336
2008/0317062 A1* 12/2008 Timmers et al. ............... 370/462
2010/0061315 A1* 3/2010 Cordeiro ........................ 370/329
2010/0062718 A1* 3/2010 Zhou et al. .................. 455/67.11

FOREIGN PATENT DOCUMENTS
JP    2006-352382      12/2006
KR    10-2007-082039    8/2007
WO    WO2007-031959     3/2007
WO    WO2007-031961     3/2007

OTHER PUBLICATIONS
"NeXt generation/dynamic spectrum access/cognitive radio wireless networks: A Survey," Ian F. Akyildiz, Won-Yeol Lee, Mehmet C. Vuran *, Shantidev Mohanty Science Direct, Computer Networks 50, pp. 2127-2159, (2006).

* cited by examiner

*Primary Examiner* — Olumide T Ajibade Akonai
(74) *Attorney, Agent, or Firm* — NSIP Law

(57) ABSTRACT

A cognitive radio base station may transmit, for each channel, common control channel information to a plurality of cognitive radio terminals at different points in time, respectively. Accordingly, the cognitive radio base station may receive a channel allocation request from the plurality of cognitive radio terminals receiving the common control channel information and allocate a plurality of channels to the plurality of cognitive radio terminals, respectively, to perform communication. In response to another terminal existing in a corresponding channel, the cognitive radio base station may update the common control channel information and switch to another channel to transmit subsequent common control channel information at, for example, a closest point in time to thereby broadcast the updated common control channel information to the plurality of cognitive radio terminals using the switched channel.

21 Claims, 10 Drawing Sheets

COGNITIVE RADIO COMMUNICATION METHOD USING DYNAMICALLY ALLOCATED COMMON CONTROL CHANNEL INFORMATION

CROSS-REFERENCE TO RELATED APPLICATION

This application claims the benefit under 35 U.S.C. §119 (a) of a Korean Patent Application No. 10-2008-0099797, filed on Oct. 10, 2008, in the Korean Intellectual Property Office, the entire disclosure of which is incorporated herein by reference.

BACKGROUND

1. Field

The following description relates to a cognitive radio communication system. More particularly, the description relates to a method that may quickly and accurately recognize a cognitive radio terminal existing in a channel using dynamically allocated common control channel information.

2. Description of Related Art

Much research is currently underway involving technologies that efficiently use limited frequency resources. Cognitive radio ("CR") technology is in the spotlight.

A cognitive radio communication system using the cognitive radio technology may recycle limited frequency resources to more effectively use frequency resources. A secondary base station and a secondary terminal that belong to a secondary communication system may periodically or aperiodically sense a radio resource that is not used in a primary communication system to thereby recognize an available frequency resource and to transmit and receive data using the recognized available frequency resource.

Accordingly, there is a need for a cognitive radio communication method that enables a base station or terminals of a cognitive radio communication system to recycle frequency resources in order to efficiently use the frequency resources and that may verify whether another terminal exists in a currently available channel and quickly and accurately transmit control information for a communication setting and a communication control between the base station and the terminals.

SUMMARY

In one general aspect, a cognitive radio communication method includes maintaining a plurality of channels to transmit common control channel information at different points in time respectively, determining, by a cognitive radio base station, the common control channel information to broadcast the common control channel information via the plurality of channels from a first point in time among the different points in time, receiving, by a cognitive radio terminal, the common control channel information to request a channel allocation from the cognitive radio base station based on the received common control channel information, and allocating, by the cognitive radio base station, a first channel with respect to the cognitive radio terminal in response to the channel allocation request.

The method may further include broadcasting, by the cognitive radio base station, the common control channel information, recognizing, by the cognitive radio base station, the existence of a primary terminal in the allocated first channel, wherein, where the primary terminal exists in the first channel, the broadcasting includes updating the common control channel information to verify a second channel for transmitting the common control channel information at a second point in time closest to the first point in time, and broadcasting the common control channel information via the plurality of channels excluding the first channel from the second point in time, where the second channel is verified.

The recognizing may include detecting, by the cognitive base station, the energy in the allocated first channel using a fast sensing scheme, and determining whether the detected energy is greater than or equal to a threshold.

The recognizing may further include performing fine sensing for the allocated first channel where the detected energy is greater than the threshold.

The recognizing may include detecting, by the cognitive radio terminal, the energy in the allocated first channel using a fast sensing scheme to determine whether the detected energy is greater than or equal to a threshold, and transmitting, by the cognitive radio terminal, the fast sensing result to the cognitive radio base station based on the fast sensing result.

The cognitive radio terminal may transmit the fast sensing result to the cognitive radio base station using a code-based random access scheme.

The recognizing may further include performing, by the cognitive radio terminal, fine sensing for a corresponding channel depending on the fast sensing result, and transmitting, by the cognitive radio terminal, the fine sensing result to the cognitive radio base station.

The cognitive radio terminal may transmit the fine sensing result to the cognitive radio base station using a code-based random access scheme.

The common control channel information may include at least one of frame synchronization information, format information of a common control channel, broadcast information, sensing interval information, access request information, and access grant information.

The allocating of the first channel may include verifying, by the cognitive radio base station, a bandwidth of a channel to be used by the cognitive radio terminal, and changing, by the cognitive radio base station, the bandwidth of the first channel to the verified bandwidth, wherein the common control channel information is broadcast based on the changed bandwidth of the channel.

The changing of the bandwidth of the first channel may include changing the bandwidth of the first channel by bonding at least two channels among the plurality of channels.

In another general aspect, a cognitive radio communication method includes maintaining a plurality of channels, determining common control channel information to broadcast, for each of the channels, the common control channel information at different points in time, respectively, receiving a channel allocation request for the channels from a plurality of cognitive radio terminals based on the broadcast common control channel information, and allocating, in response to the received channel allocation request, the plurality of channels to the plurality of cognitive radio terminals, respectively.

The method may further include recognizing a signal of a primary terminal in a particular channel among the plurality of channels, and updating the common control channel information to broadcast the updated common control channel information via the remaining channels excluding the particular channel, where the signal of the primary terminal is recognized in the particular channel, wherein the remaining channels excluding the particular channel, are allocated to the plurality of cognitive radio terminals, respectively, based on the updated common control channel information.

The recognizing of the signal may include performing fast sensing and fine sensing for the particular channel to recognize the signal of the primary terminal.

The recognizing of the signal may include receiving the fast sensing result from a cognitive radio terminal allocated to the particular channel and receiving the fine sensing result from the plurality of cognitive radio terminals in correspondence to the fast sensing result to recognize the signal of the primary terminal according to the received fine sensing result.

The plurality of cognitive radio terminals may transmit the fine sensing result using a code-based random access scheme.

In still another general aspect, a cognitive radio communication method includes recognizing the existence of a primary terminal according to a fast sensing scheme to transmit first information according to the fast sensing scheme to a cognitive radio base station, transmitting, to the cognitive radio base station, in response to a request from the cognitive radio base station receiving the first information, second information that includes a fine sensing result that is obtained by performing fine sensing for a signal of the primary terminal according to a fine sensing scheme, and receiving, from the cognitive radio base station, common control channel information that is updated based on the second information, to request the cognitive radio base station for allocation of an available channel among a plurality of channels based on the received common control channel information.

The first information or the second information may be transmitted to the cognitive radio base station using a code-based random access scheme.

In yet another general aspect, a cognitive radio communication method includes maintaining a plurality of channels, determining common control channel information to broadcast, for each of the channels, the common control channel information to a plurality of cognitive radio terminals at different points in time, respectively, and to allocate the plurality of channels to the plurality of cognitive radio terminals, respectively, in response to a request from the cognitive radio terminals receiving the common control channel information, recognizing, from the plurality of channels allocated to the plurality of cognitive radio terminals, a channel where a secondary terminal exists, and separately communicating with the secondary terminal and a cognitive radio terminal allocated to a corresponding channel via the corresponding channel.

The recognizing of the channel may include updating the common control channel information, and switching to a channel for transmitting the common control channel information at a closest point in time, among the remaining channels excluding the corresponding channel, to broadcast the updated common control channel information.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Hereinafter, a primary terminal assigned with a priority for a channel use and a secondary terminal not assigned with the priority for the channel use may each be generally referred to as a cognitive radio terminal.

Figure 1:
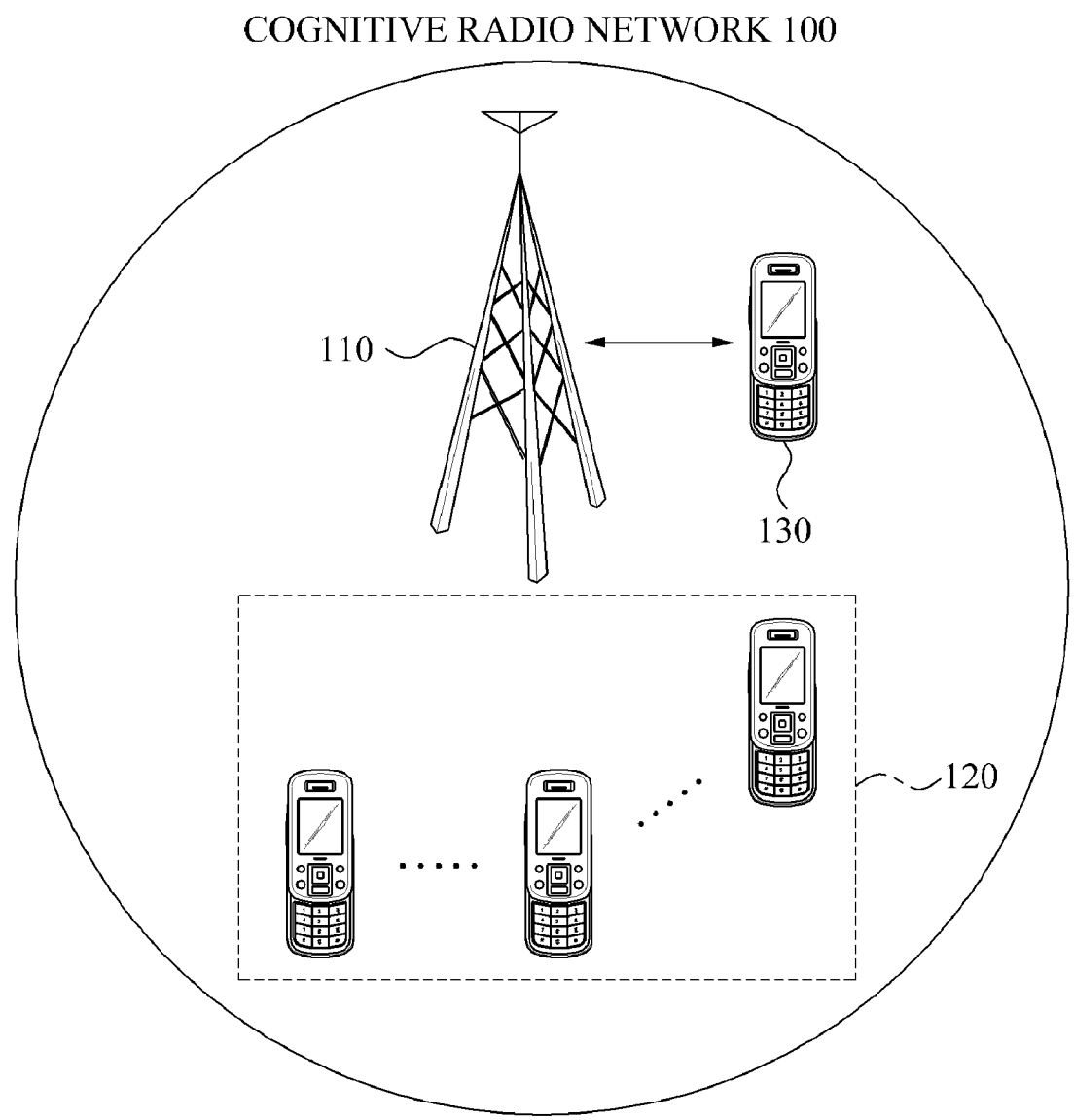
FIG. 1 is a diagram illustrating an exemplary cognitive radio network.

FIG. 1 illustrates an exemplary cognitive radio network 100. The cognitive radio network 100 may include a cognitive radio base station 110, cognitive radio terminals 120 and 130, and a plurality of channels (not shown) used for communication between the cognitive radio base station 110 and the cognitive radio communication terminals 120 and 130. The cognitive radio base station 110, may transmit a parameter for a communication setting and communication control ("common control channel information") using a common control channel at different points in time via the plurality of channels to thereby effectively use limited frequency resources.

Here, the common control channel information may include all the control information that may need to be received by all the nodes positioned in a system or a network. For example, the common control channel information may be used to request an access to a frequency resource allocated to a channel, to allocate a corresponding frequency resource, or to inform switching information to an adjacent channel and thereby enable load balancing. Also, the common control channel information may be used to solve a hidden node problem in the network, or to transmit and receive broadcast information such as a beacon.

While FIG. 1 illustrates centralized cognitive radio network 100 including the cognitive radio base station 110 and the cognitive radio terminals 120 and 130 to illustrate an exemplary cognitive radio communication method, it is not limited thereto. For example, the cognitive radio network 100 may be a distributed network where a particular terminal functions as a base station or a network where unlicensed equipment or systems such as a mike, Bluetooth, and the like perform a communication using multiple channels.

Referring again to FIG. 1, the cognitive radio base station 110 may provide a plurality of channels to the cognitive radio terminals 120 and 130 included in the cognitive radio network 100 and recycle the plurality of channels using a scheme of supporting communication protocols between terminals. The cognitive radio base station 110 and the cognitive radio terminals 120 and 130 may use predetermined common control channel information in order to perform a communication setting or communication control for each of the channels.

For example, where a secondary terminal is assigned to an available first channel to perform a communication with the cognitive radio base station 110 using the assigned first channel, a primary terminal having a priority for use of the first channel may exist in the first channel. In this case, the cognitive radio base station 110 may recognize the existence of the primary terminal in the first channel using a fast sensing scheme or a fine sensing scheme. Where the existence of the primary terminal 130 is recognized in the first channel, the cognitive radio base station 110 may update the common control channel information to inform each of the cognitive radio terminals 120 and 130 that the first channel is unavailable and thus switch to another available channel.

For example, where any one of the cognitive radio terminals 120 and 130 is assigned with the available first channel to perform the communication with the cognitive radio base station 110 using the assigned first channel, the secondary terminal having no priority for use of the first channel may exist in the first channel. In this case, a cognitive radio terminal assigned to the first channel and the secondary terminal may share the first channel. It will be described later with reference to FIG. 10.

Accordingly, a cognitive radio communication method may distribute loads occurring in a channel to thereby effectively use frequency resources and solve an existing hidden node problem.

The cognitive radio base station 100 of a multi-channel environment may dynamically allocate common control channel information using a scheme of transmitting common control channel information in a predetermined time slot or using a hybrid scheme where conventional schemes of transmitting common control channel information in a predetermined frequency interval are combined. Accordingly, the cognitive radio base station 100 may quickly inform all the terminals of the cognitive radio network 100 about the updated common control channel information and thereby improve a Quality of Service (QoS).

Figure 2:
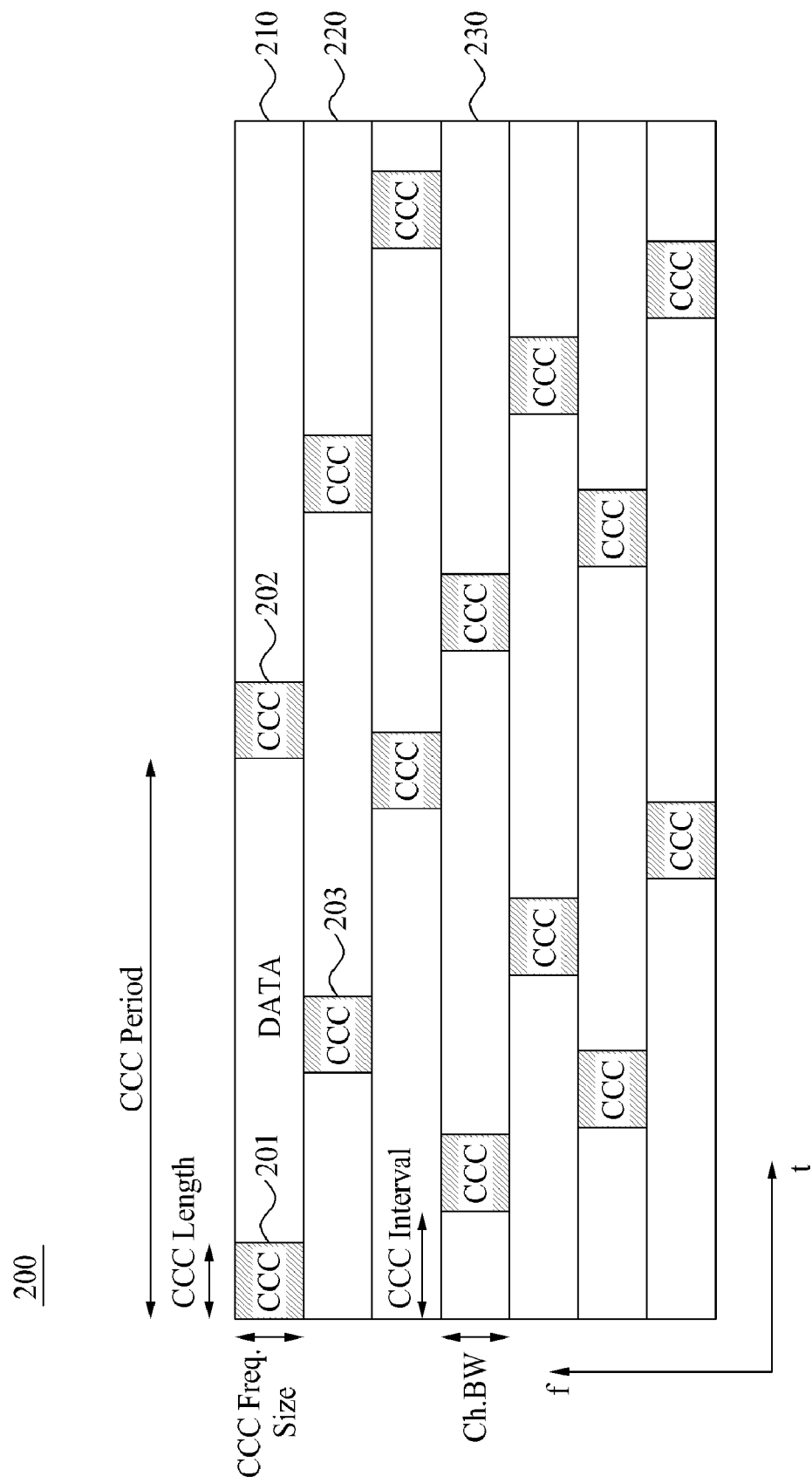
FIG. 2 is a diagram illustrating a channel view of an exemplary cognitive radio network including a plurality of channels and a plurality of common control channels dynamically allocated to the plurality of channels.

FIG. 2 illustrates a channel view of an exemplary cognitive radio network including a plurality of channels and a plurality of common control channels dynamically allocated to the plurality of channels. A multiple channel 200 may include a plurality of channels. Each of the channels may include a common control channel ("CCC") for transmitting a parameter, that is, common control channel information at each different point in time. For this, the cognitive radio base station 110 may determine parameters, for example, a CCC length, a CCC frequency size, an available channel set, a CCC pattern, a CCC period, a CCC interval, and the like, for each frame. The cognitive radio base station 110 may transfer the determined parameters to network terminals using a frame channel and a broadcast channel of the common control channel. Accordingly, each terminal may select a single channel from the entire available channels and may verify the parameters via the frame channel and the broadcast channel of the common control channel that is transmitted via the selected channel. Hereinafter, parameters that are transmitted via the common control channel as well as information that is transmitted via a channel constituting the common control channel, for example, the frame channel, the broadcast channel, and the like, are referred to as "common control channel information".

For example, in a first channel 210, common control channel information 201 having a CCC length and a CCC frequency size may be transmitted at a first point in time and second common control channel information 202 having the same size as the common control channel information 201 may be subsequently transmitted after a predetermined CCC period is elapsed. Similarly, in a second channel 220, common control channel information 203 having the same size as the common control channel information 201 and 202 may be transmitted at a second point in time, and then subsequent common control channel information may be transmitted after a predetermined CCC period is elapsed.

Where a cognitive radio terminal assigned with priority for a channel use exists in the first channel 210, the cognitive radio base station may update the common control channel information and inform each cognitive radio terminal about the above existence. The cognitive radio base station may switch to a third channel 230 for transmitting the common control channel information at a point in time closest to a point in time where the first channel 210 transmits the common control channel information and may broadcast the updated common control channel information to the cognitive radio terminals included in a cognitive radio network using the third channel 230.

Accordingly, the cognitive radio terminals may verify the updated common control channel information after a CCC interval, without a need to wait for the CCC period.

For example, a point in time for transmitting common control channel information and a point in time of transmitting and receiving data may be differently allocated to each of the channels of the cognitive radio network. All the regions of the common control channel information may be used to transmit control information. All the cognitive radio terminals that are not transmitting data may need to receive the common control channel information using an idle time. As shown in FIG. 2, common control channel information may be transmitted at a different point in time for each channel. Accordingly, even where other cognitive radio terminals such as a primary terminal, a secondary terminal, and the like temporarily exist, it is possible to quickly and accurately cope with the existence of the other cognitive radio terminals using the common control channel information of another channel at an adjacent point in time. Through this, a QoS in the cognitive radio network may be improved.

Hereinafter, two formats of common control channel information will be described using a centralized network in the structure of a base station and a terminal shown in FIG. 3, and using a distributed network in the structure of a master node and a general node shown in FIG. 4. Here, the master node may function as a base station.

Figure 3:
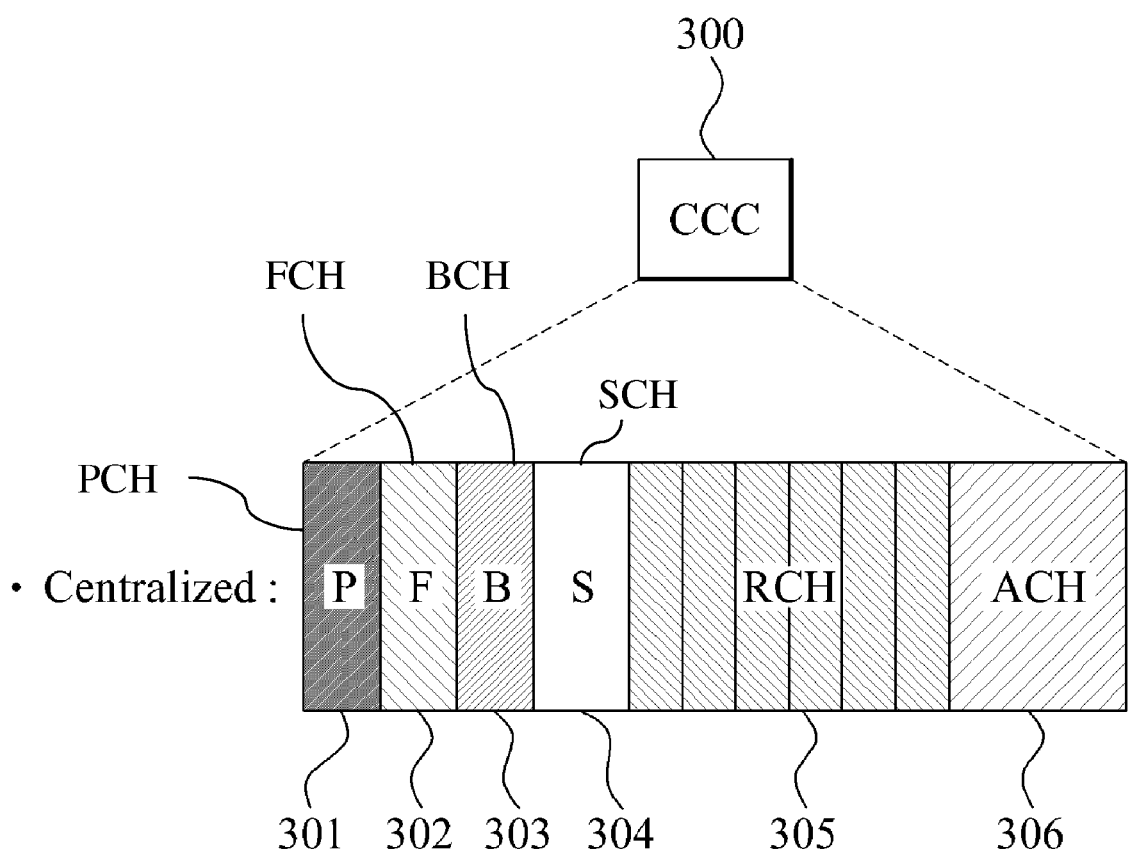
FIG. 3 is a diagram illustrating an exemplary format of common control channel information.

FIG. 3 illustrates an exemplary format of common control channel information. In a centralized cognitive radio network, common control channel information 300 in a format as shown in FIG. 3 may be used. Generally, the common control channel information 300 used in the centralized cognitive radio network may include preamble information ("PCH") 301 for frame synchronization, frame channel information ("FCH") 302, broadcast channel information ("BCH") 303, sensing interval information ("SCH")304, random channel information ("RCH") 305 consisting of a plurality of slots, and acknowledge channel information ("ACH") 306.

The preamble information 301 may be used to transmit previously guaranteed information for synchronization of the common control channel information 300. The frame channel information 302 may be used to inform the format of the common control channel information 300. For example, the frame channel information 302 may be used to transmit information associated with a duration of the common control channel information 300 on a temporal axis, the size thereof on a frequency axis, and the bandwidth of each channel. A location and size of the frame channel information may be set to be definite at all times. Accordingly, although the common control channel information 300 is updated, the cognitive radio terminals may verify the updated frame channel information at the fixed location.

The broadcast channel information 303 may be used to transmit information associated with an available channel set in a network, a CCC pattern for allocation of the common control channel information 300, a transmission period thereof, an interval therebetween, and the like.

The sensing interval information 304 may be used to perform fast sensing. For example, the cognitive radio base station or cognitive radio terminals receiving the common control channel information 300 may perform fast sensing such as an energy detection in order to verify whether another terminal exists in a corresponding channel based on the sensing interval information 304.

The random channel information 305 may include the plurality of access slots. A cognitive radio terminal needing a data transmission may attempt a random access to an available channel using the plurality of access slots. Accordingly, where the cognitive radio terminals attempt the random access to the cognitive radio base station, codes of the cognitive radio terminals may be duplicated. However, the cognitive radio base station may identify the code of each cognitive radio terminal without causing a collision. For example, the cognitive radio communication method according to example embodiments may pre-set a code to be used depending on whether a primary terminal or a secondary terminal exists, and may verify the existence of the primary terminal or the secondary terminal using the corresponding code in the cognitive radio base station.

In the case of the random access of the cognitive radio terminal, the random channel information 305 may include information associated with an amount of resources to be used, a QoS of traffic, and the like. The acknowledgement channel information 306 may be used to transmit acknowledgment ("ACK") or not acknowledgement ("NACK") in response to the random access of the cognitive radio terminal. In the case of the ACK, a greater amount of resources may be used.

Figure 4:
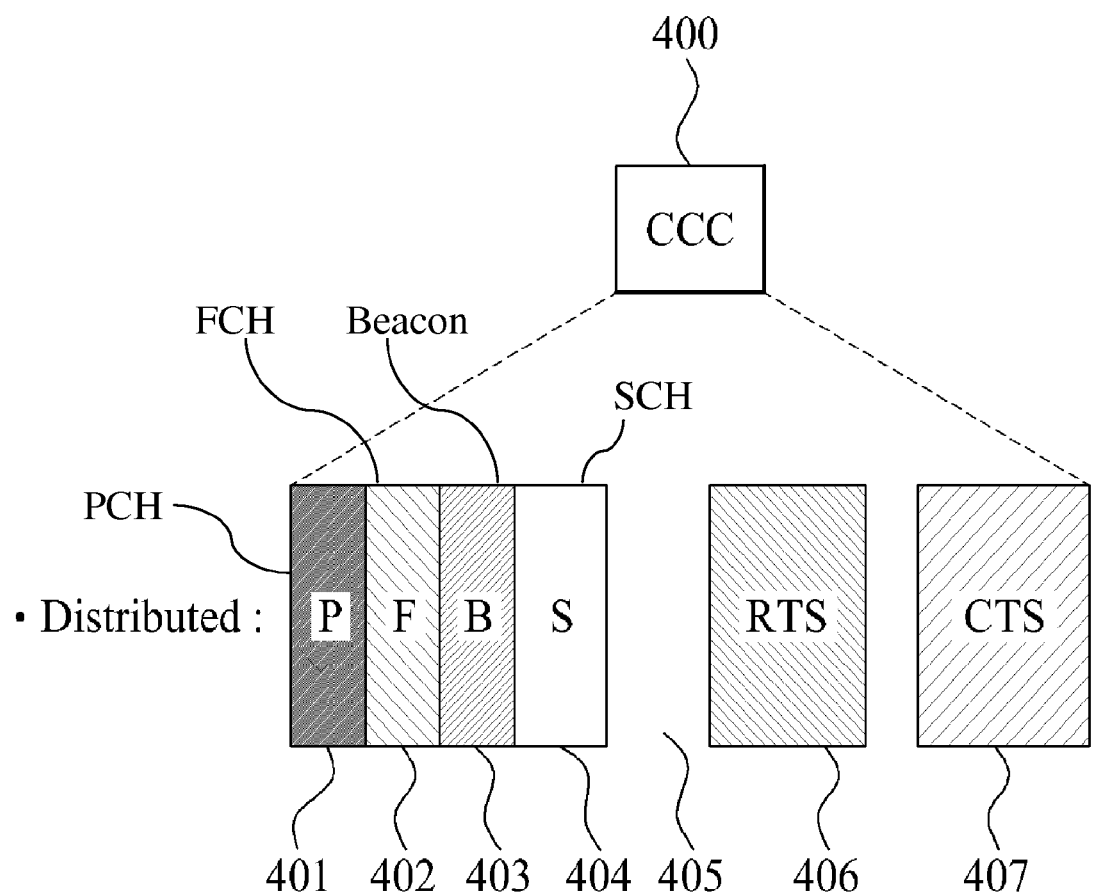
FIG. 4 is a diagram illustrating another exemplary format of common control channel information.

FIG. 4 illustrates another exemplary format of common control channel information. In a distributed cognitive network, common control channel information 400 in a format as shown in FIG. 4 may be used. Generally, the distributed cognitive radio network may be embodied by communications between cognitive radio terminals, for example, nodes. A particular cognitive radio terminal, for example, a master node, may function as a cognitive radio base station in a centralized scheme. Here, the common control channel information 400 broadcast by the particular cognitive radio terminal may include PCH 401, FCH 402, beacon information 403, and SCH 404. The above information may perform the similar function as in the centralized cognitive radio network.

The beacon information 403 may perform the same function as the BCH 303 of the centralized cognitive radio network. The beacon information 403 may use a carrier sense multiple access/collision avoidance ("CSMA/CA") of Institute of Electrical and Electronics Engineers ("IEEE") 802.11 WLAN. Accordingly, the common control channel information 400 may include a backoff interval, a Ready-to-Send ("RTS") message, and a Clear-to-Send ("CTS") message. For example, the common control channel information 400 broadcast by the particular cognitive radio terminal may include RTS information 406 performing the same function as the RCH 305 of FIG. 3 and CTS information 407 performing the same function as the ACH 306 of FIG. 3. The information 401 through 404, the RTS information 406, and the CTS information 407 may be identified by a time delay using a backoff 405.

Hereinafter, an exemplary cognitive radio communication method that may dynamically allocate common control channel information in the formats described above with reference to FIGS. 3 and 4 to thereby recycle frequency resources will be described with reference to FIGS. 5 through 8.

Figure 5:
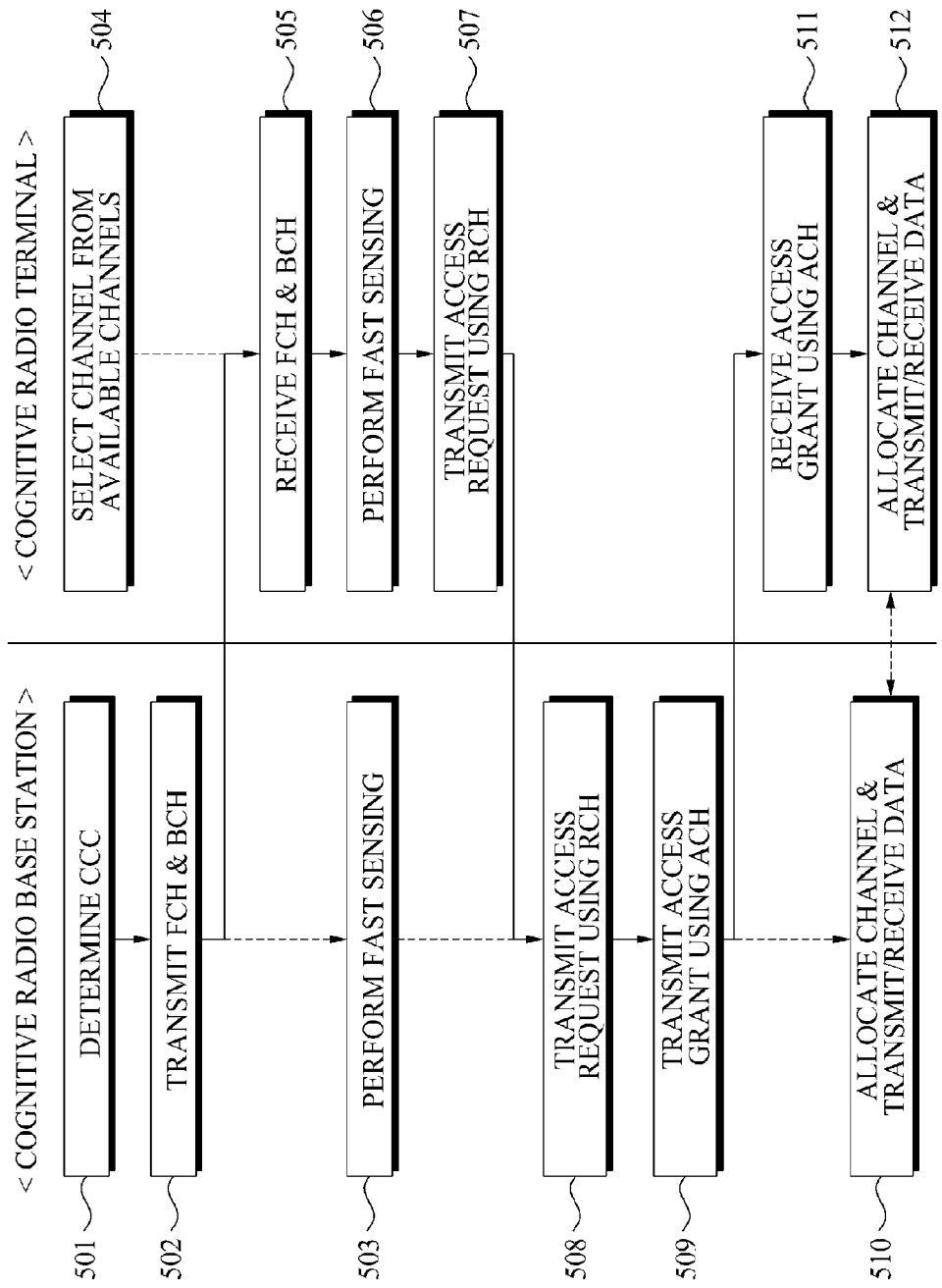
FIG. 5 is a flowchart illustrating an exemplary operation between a cognitive radio base station and a cognitive radio terminal.

FIG. 5 illustrates an exemplary operation between a cognitive radio base station and a cognitive radio terminal. A centralized cognitive radio network including a cognitive radio base station and a cognitive radio terminal will be described. The descriptions will be applicable to a distributed cognitive radio network as is where a particular terminal functions as a base station. In operation 501, a cognitive radio base station may determine common control channel information to be broadcast to cognitive radio terminals connected to a cognitive radio network. The common control channel information to be broadcast to the cognitive radio terminals may be determined for each frame.

In operation 502, the cognitive radio base station may transmit FCH and BCH included in the determined common control channel information at different points in time respectively, using a plurality of channels.

In operation 504, a cognitive radio terminal may select a single channel from available channels in the cognitive radio network. In operation 505, the cognitive radio terminal may receive the FCH and the BCH from the cognitive radio base station via the selected channel. The cognitive radio terminal may verify a format of the common control channel information using the FCH. For this, the FCH may include information associated with the common control channel information such as a CCC length and a CCC frequency size, and the bandwidth of each channel. The cognitive radio terminal may verify available channel information using the BCH. The BCH may include information associated with a CCC pattern, a CCC period, a CCC interval, and the like. The cognitive radio terminal may accurately receive the common control channel information using the BCH.

In operations 503 and 506, the cognitive radio base station and the cognitive radio terminal may perform fast sensing in order to verify whether the cognitive radio terminal exists in a current channel. For example, in operation 503, the cognitive radio base station may perform fast sensing after performing operation 502. In operation 506, the cognitive radio terminal may perform fast sensing after performing operation 505. The fast sensing scheme may be used to detect the energy occurring in the channel and to determine whether the cognitive radio terminal exists in the channel. The exemplary cognitive radio communication method as described here relates to a situation where another cognitive radio terminal does not exist in an allocated channel. Another exemplary cognitive radio communication method where another cognitive radio terminal does exist in the allocated channel is described below with reference to FIGS. 6 and 7.

In operation 507, the cognitive radio terminal may reflect the fast sensing result and transmit, to the cognitive radio base station, an access request for a channel allocation. The access request may include a request for a current available channel. For example, in operation 507, the cognitive radio terminal may transmit the access request using RCH of the common control channel information.

In operation 508, the cognitive radio base station may receive the access request using the RCH. In operation 509, the cognitive radio base station may transmit, to the cognitive radio terminal, access grant including information associated with an allocable channel among the plurality of channels. In this instance, the cognitive radio base station may transmit the access grant to the cognitive radio terminal using ACH of the common control channel information.

In operation 511, the cognitive radio terminal may verify the access grant using the ACH received from the cognitive radio base station and may be allocated to the available channel.

In operations 510 and 512, the channel may be allocated between the cognitive radio base station and the cognitive radio terminal to transmit and receive data. The cognitive radio base station may transmit newly determined common control channel information to other channels by using, as available channels, the remaining channels excluding the channel allocated in operations 510 and 512. Through this, a channel with the cognitive radio base station may be allocated to each cognitive radio terminal in the multi-channel environment.

A cognitive radio base station may transmit common control channel information at a point in time dynamically allocated for each channel and thereby inform each cognitive radio terminal about a channel state and the like at intervals shorter than a CCC period of the common control channel information. Accordingly, a cognitive radio network may quickly and accurately intermediate a channel use to thereby improve a QoS.

Figure 6:
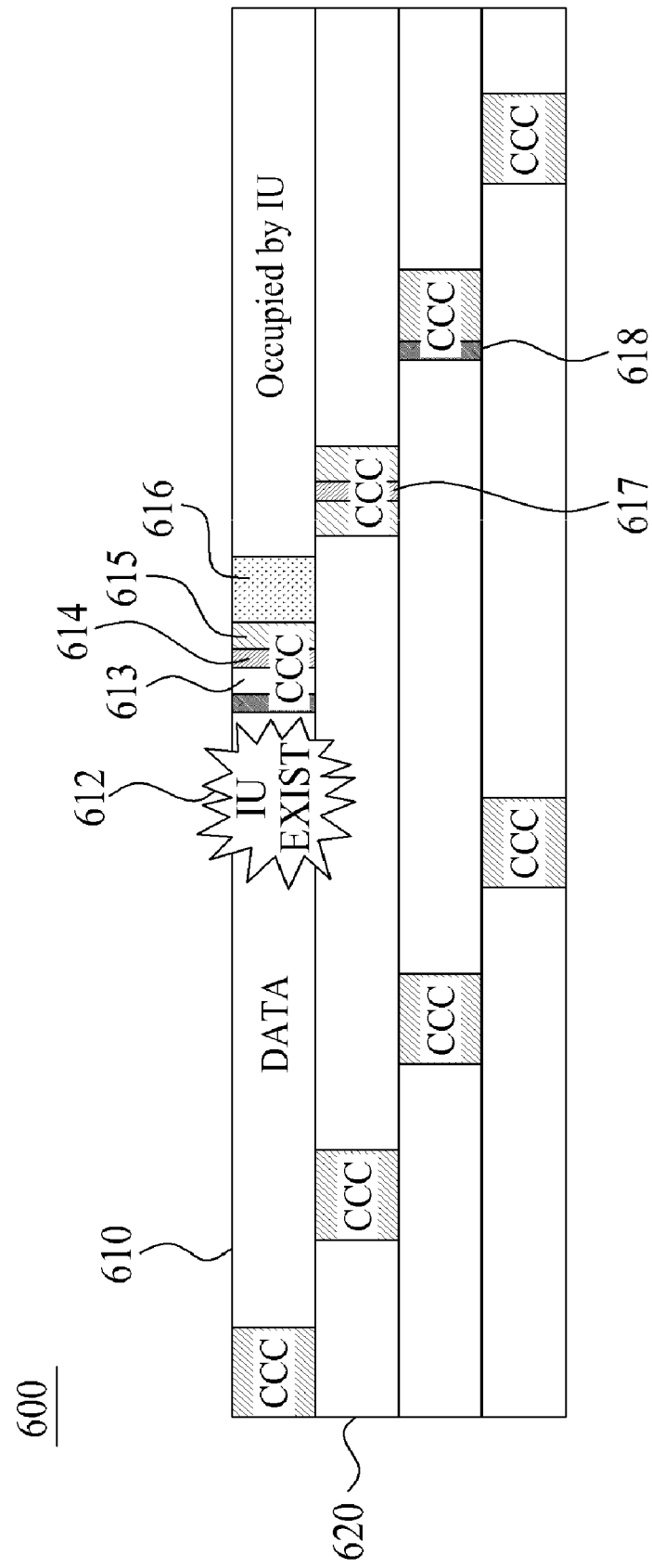
FIG. 6 is a diagram a channel view of an exemplary cognitive radio network including at least two cognitive radio terminals in an allocated channel.

FIG. 6 illustrates an exemplary cognitive radio network 600 including at least two cognitive radio terminals in an allocated channel. A cognitive radio base station may transmit common control channel information via each channel at a point in time faster than a CCC period.

Where an incumbent user ("IU") 612 corresponding to a primary terminal exists in a first channel 610, the cognitive radio base station may recognize the existence of the IU 612 from a cognitive radio terminal allocated to the first channel 610. For example, the cognitive radio terminal and the cognitive radio base station may recognize the existence of the IU 612 using CCC information 613, 614, and 615, and a data transmission/reception interval 616.

For example, the cognitive radio base station may recognize the existence of the IU 612 by performing fast sensing at a point in time prior to the CCC interval 613. It may correspond to fast sensing performed by the cognitive radio base station in operation 503 of FIG. 5 based on the transmitted common control channel information.

Where the IP, that is, the primary terminal exists, the cognitive radio base station may perform fast sensing and detect the energy of the primary terminal to thereby recognize the existence of the IU 612. The cognitive radio base station may inform the fast sensing result to the cognitive radio terminal that is allocated to the channel according to a code-based random access scheme based on RCH 614. Also, the cognitive radio base station may request the cognitive radio terminals to perform fine sensing using ACH 615, without sending access grant information for the channel allocation. The cognitive radio base station and the cognitive radio terminal may perform fine sensing at a point in time where transmission/reception of data starts among channels, that is, at the interval 616, and determine whether the existence of the IU 612 is recognized.

In view of the cognitive radio base station, where the existence of the IU 612 is recognized according to fine sensing at the point in time 616 where transmission/reception of data starts, the cognitive radio base station may suspend allocation or use of the first channel 610. The cognitive radio base station may reflect parameters to be changed according to the suspension to thereby update the common control channel information. At a point in time closest to a point in time for transmitting common control channel information after the existence of the IU 612 in the first channel 610, the cognitive radio base station may transmit the updated common control channel information to the cognitive radio terminals using a broadcast channel of a second channel 620. Through this, the cognitive radio terminals may continuously communicate with the cognitive radio base station based on the updated common control channel information.

In view of the cognitive radio terminal, the cognitive radio terminal may report, to the cognitive radio base station, the fine sensing result at the point in time 616 where transmission/reception of data starts, using RCH617 of the second channel 620. The RCH 617 may be common control channel information at the point in time closest to a point in time for transmitting common control channel information after the existence of the IU 612 and may enable the reporting operation to be quickly performed. The fine sensing result may be reported from the cognitive radio terminal to the cognitive radio base station according to the code-based random access scheme.

For example, in response to the request from the cognitive radio base station, the cognitive radio terminal may perform fast sensing and recognize the existence of the IU 612. The above fast sensing may correspond to fast sensing that is performed by the cognitive radio terminal in operation 506 of FIG. 5.

The cognitive radio terminal may report the fast sensing result to the cognitive radio base station using the random channel information 614 and may receive a fine sensing command from the cognitive radio base station using the ACH 615. According to the fine sensing command, the cognitive radio terminal may recognize the existence of the IU 612 by performing fine sensing. Where the existence of the IU 612 is recognized, the cognitive radio terminal may report the above event to the cognitive radio base station using the RCH 617 of the second channel 620. Through this, the cognitive radio terminal may enable the updated common channel information to be transmitted to terminals using broadcast channel information of the second channel 620. The fast sensing result and the fine sensing result also may be transmitted to the cognitive radio base station according to the code-based random access scheme.

The cognitive radio base station or the cognitive radio terminal may perform fine sensing using a matched filter or a cyclostationary signal analysis. As described above, where another cognitive radio terminal such as a primary terminal or a secondary terminal exists in a current channel, the cognitive radio base station and the cognitive radio terminal may recognize the existence of the other cognitive radio terminal and then immediately prevent interference that may occur between the cognitive radio terminals. Through this, frequency resources may be effectively recycled in a multi-channel environment.

Figure 7:
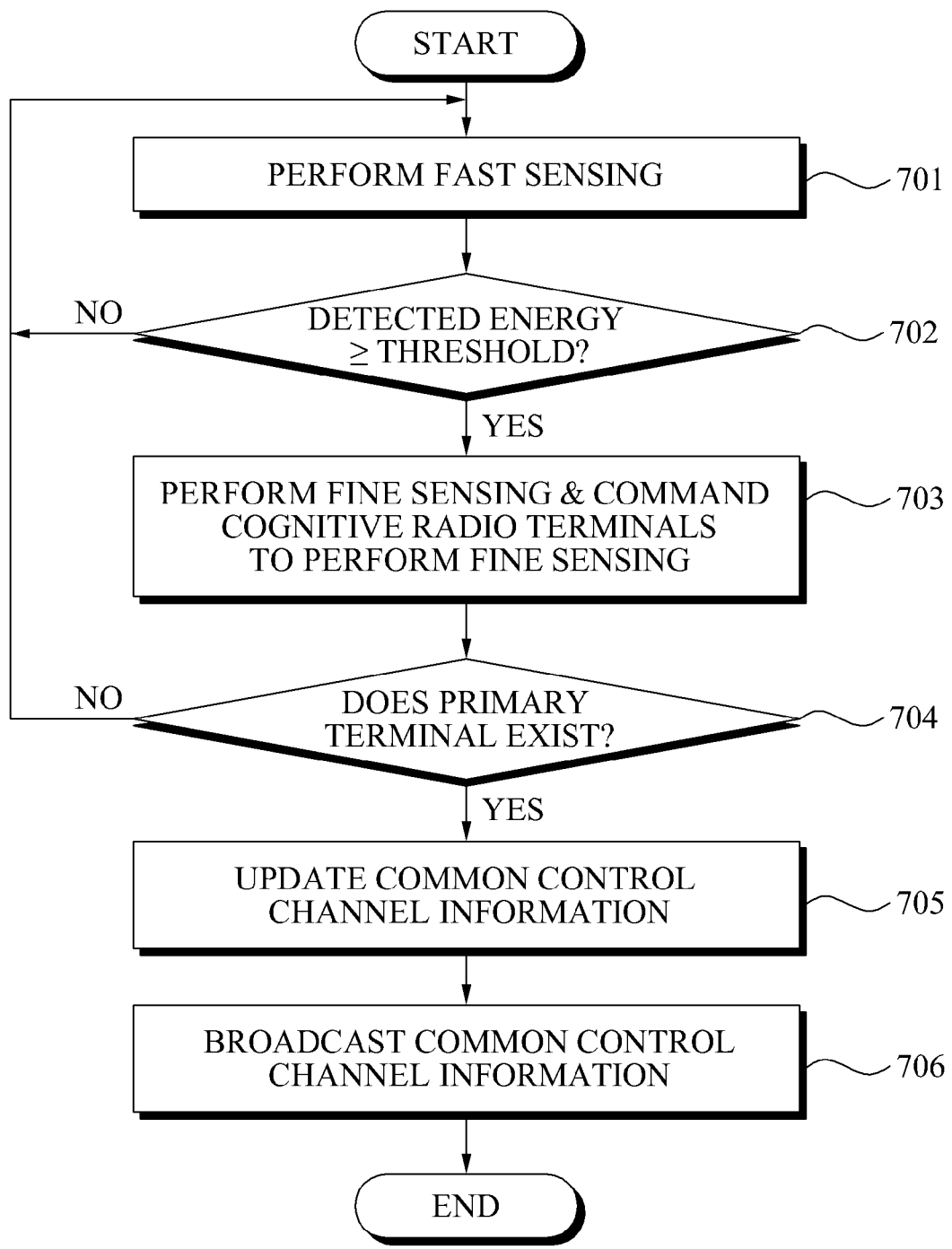
FIG. 7 is a flowchart illustrating an exemplary method of recognizing the existence of a cognitive radio terminal by a cognitive radio base station.

FIG. 7 illustrates an exemplary method of recognizing the existence of a cognitive radio terminal by a cognitive radio base station In operation 701, the cognitive radio base station may perform fast sensing to detect the energy in a channel. Operation 701 may correspond to operation 503 of FIG. 5. Although the energy is not detected in the channel based on the fast sensing result in FIG. 5, the energy is detected in FIG. 7.

In operation 702, the cognitive radio base station may determine whether the detected energy is greater than or equal to a threshold. Where the detected energy is greater than or equal to the threshold, the cognitive radio base station may perform fine sensing in operation 703. Where the detected energy is less than the threshold, the cognitive radio base station may return to operation 701.

In operation 703, the cognitive radio base station may command the cognitive radio terminals to perform fine sensing.

In operation 704, the cognitive radio base station may determine a primary terminal exists in a channel based on the fine sensing result. For example, the cognitive radio base station may determine whether the primary terminal exists in the terminal based on the performed fine sensing result. Also, the cognitive radio base station may receive the fine sensing result from the cognitive radio terminals that are requested to perform fine sensing and may determine whether the primary terminal exists.

Where the primary terminal exists in the channel, the cognitive radio base station may update common control channel information in operation 705.

The cognitive radio base station may broadcast the updated common control channel information to the cognitive radio terminals using another channel in operation 706. Where the primary terminal does not exist in the channel, the cognitive radio base station may return to operation 701.

Here, as shown in FIG. 6, the cognitive radio base station may switch to another channel that transmits other common control channel information at an adjacent point in time to thereby broadcast the updated common control channel information. For example, where a cognitive radio terminal exists in a channel, a cognitive radio base station may switch to another channel that may transmit updated common control channel information at a point in time closest to a point in time for transmitting common control channel information in the channel and thereby quickly and accurately broadcast the updated common control channel information using the switched channel.

A cognitive radio communication method using the cognitive radio base station may recognize the existence of a primary terminal in a currently allocated channel and thereby immediately prevent interference that may occur between the cognitive radio terminals and may effectively recycle frequency resources in a multi-channel environment.

Figure 8:
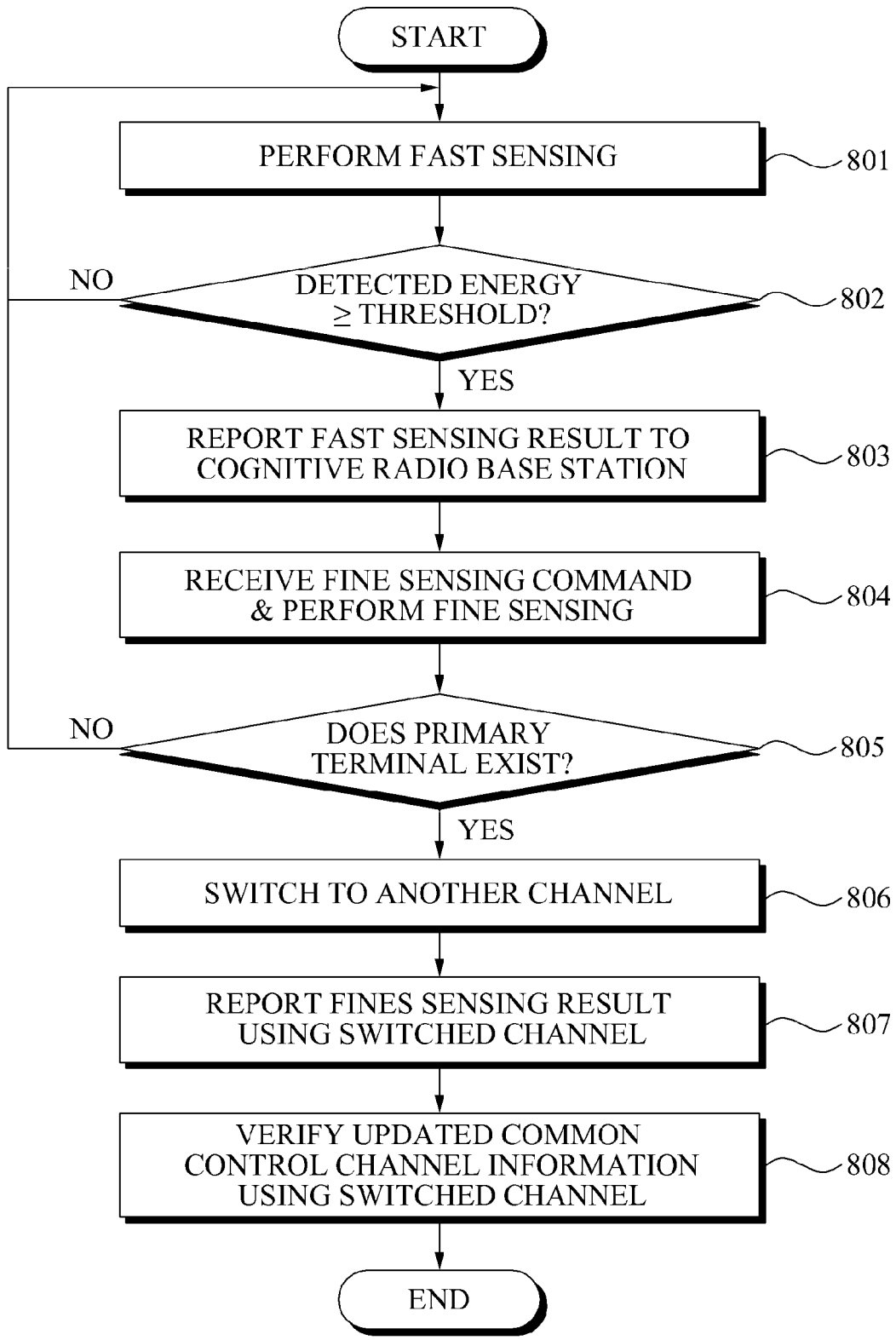
FIG. 8 is a flowchart illustrating another exemplary method of recognizing the existence of another cognitive radio terminal by a cognitive radio terminal.

FIG. 8 illustrates another method of recognizing the existence of another cognitive radio terminal by a cognitive radio terminal. In operation 801, a cognitive radio terminal may perform fast sensing to detect the energy in a channel. Operation 801 may correspond to operation 506 of FIG. 5. Although the energy is not detected in the channel based on the fast sensing result, the energy is detected in FIG. 7.

In operation 802, the cognitive radio terminal may determine whether the detected energy is greater than or equal to a threshold. Where the detected energy is greater than or equal to the threshold, the cognitive radio terminal may report the fast sensing result to the cognitive radio base station in operation 803. Where the detected energy is less than the threshold, the cognitive radio terminal may return to operation 801.

The cognitive radio base station may request the cognitive radio terminal to perform fine sensing for the channel based on the received fast sensing result. The cognitive radio terminal may receive the fine sensing command from the cognitive radio base station to perform fine sensing in operation 804.

In operation 805, the cognitive radio terminal may determine whether another cognitive radio terminal exists in the channel based on the fine sensing result. Where the other cognitive radio terminal, that is, a primary terminal exists in the channel, the cognitive radio terminal may switch to another channel in operation 806. Where the primary terminal does not exist in the channel, the cognitive radio terminal may return to operation 801. The cognitive radio terminal may select, as the other channel, a channel for transmitting updated common control channel at a point in time closest to a point in time for transmitting previous common control channel information among a plurality of channels.

In operation 807, the cognitive radio terminal may report the fine sensing result to the cognitive radio base station using the switched channel. In operation 808, the cognitive radio terminal may receive and verify the updated common control channel information using the switched channel.

A cognitive radio communication method using the cognitive radio base station may recognize the existence of a cognitive radio terminal such as a primary terminal or a secondary terminal in a currently allocated channel and thereby immediately prevent interference that may occur between cognitive radio terminals and may effectively recycle frequency resources in a multi-channel environment.

Figure 9:
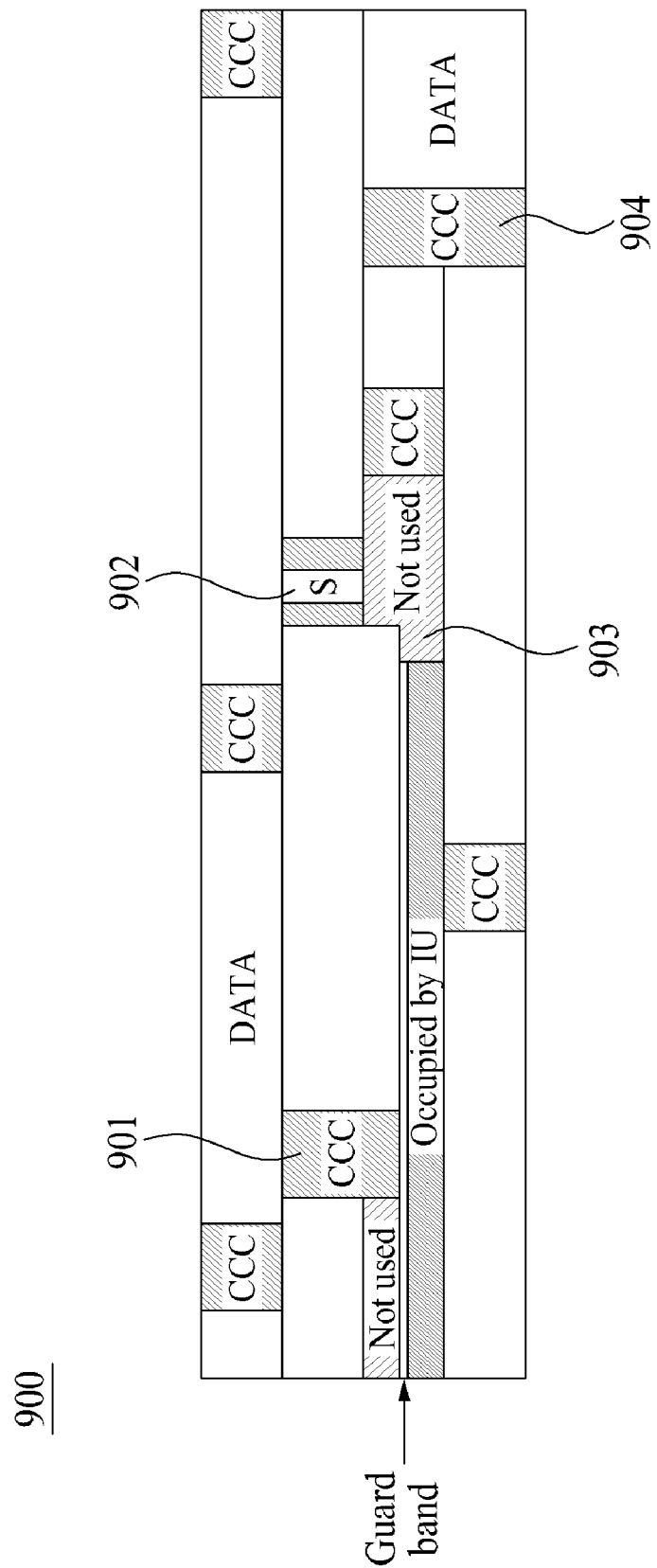
FIG. 9 is a diagram illustrating a channel view of an exemplary cognitive radio network including common control channel information corresponding to the bandwidth of a variably allocated channel.

FIG. 9 illustrates a channel view of an exemplary cognitive radio network including common control channel information corresponding to the bandwidth of a variably allocated channel. Where a cognitive radio terminal exists in a terminal, a cognitive radio base station may change the bandwidth of the channel and the bandwidth of a common control channel. For example, where a terminal using only a portion of a single channel, such as a mike, exists in a channel, an operation of adjusting the bandwidth of the channel and the bandwidth of the common control channel may be performed as shown in FIG. 9.

The cognitive radio base station or the cognitive radio terminal may perform fast sensing in advance to thereby recognize the existence of another cognitive radio terminal in a corresponding channel. In this instance, as shown in a time slot 901, where the bandwidth of the channel occupied by the cognitive radio terminal is verified, the cognitive radio base station or the cognitive radio terminal may variably expand and allocate the bandwidth of the channel and the bandwidth of the common control channel at a subsequent point in time for transmitting subsequent common control channel information in another channel. A guard band may be provided in order to prevent damage to the other cognitive radio terminal that is allocated with the channel and exists in the channel.

As described above, where it is determined the other recognized radio terminal optimizing and using the bandwidth of the cannel and the common control channel and does not exist in the channel any more through sensing as shown in time slots 902 and 903, the cognitive radio base station or the cognitive radio terminal may use again the channel that is not used due to the existence of the other cognitive radio terminal in the channel. For this, as shown in FIG. 9, it is possible to adjust the common control channel 902 and the bandwidth of the channel to their original states and thereby use again the same.

For an enhanced transmission efficiency, a cognitive radio communication method may bond at least two channels among a plurality of channels and use the bonded channel as shown in a time slot 904. In this case, it is possible to adjust the bandwidth of the common control channel in correspondence to the bandwidth of the bonded channel.

As described above, a cognitive radio communication method may flexibly change the bandwidth of a common control channel and a data channel to be appropriate for a multi-channel environment and thereby effectively use available frequency bands. Also, the cognitive radio communication method may improve a channel access success rate of a cognitive radio terminal by reflecting a traffic load amount according to the variable bandwidth of the common control channel.

Figure 10:
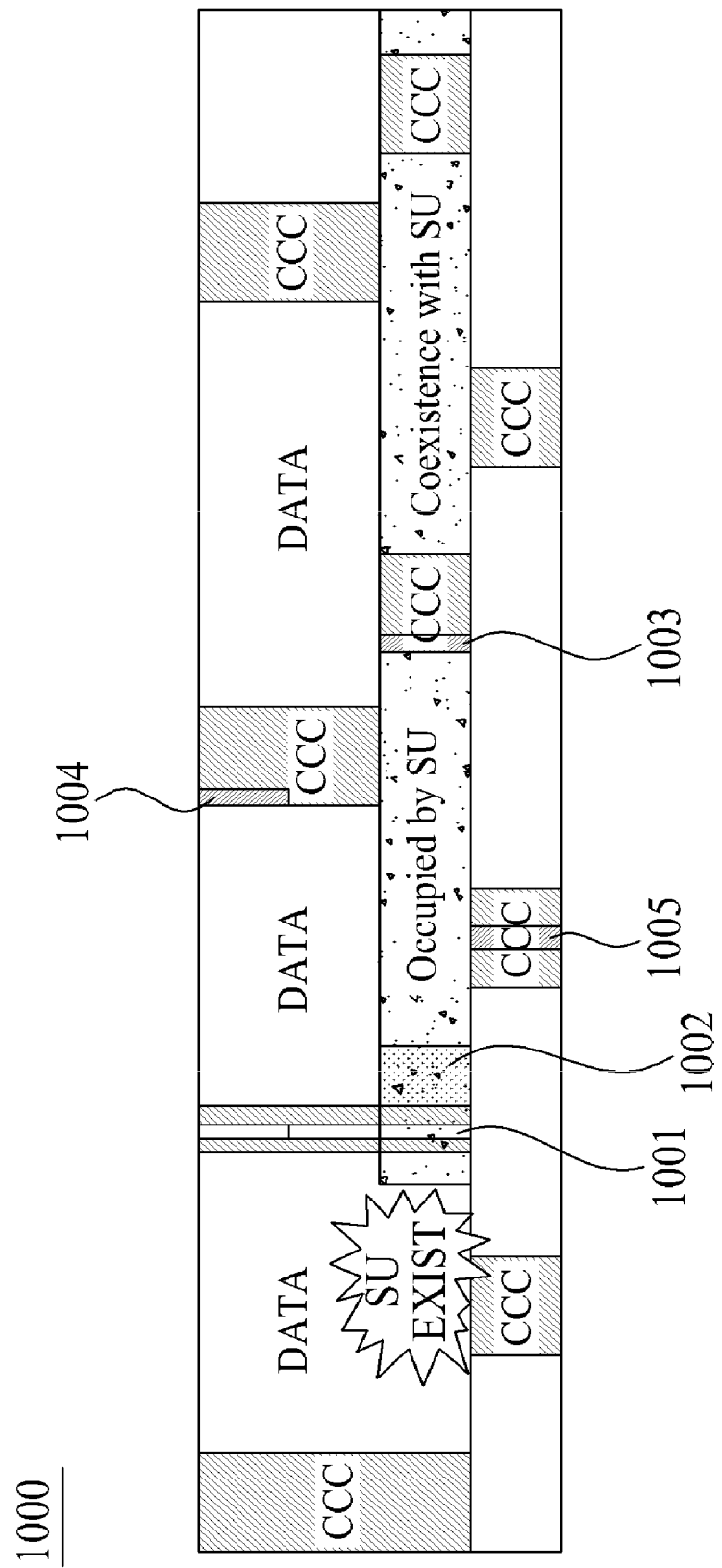
FIG. 10 is a diagram illustrating a channel view of an exemplary cognitive radio network including at least two cognitive radio terminals in a channel.

FIG. 10 illustrates a channel view of an exemplary cognitive radio network including at least two cognitive radio terminals in a channel. Where a secondary user (SU) corresponding to a secondary terminal exists in a particular channel among a plurality of channels constituting a network, a cognitive radio base station may recognize the existence of the SU and change the bandwidth of the channel and the common control channel. For example, in a time slot 1001, where the secondary terminal exists in the channel, the cognitive radio base station or the cognitive radio terminal may detect the energy in the channel by performing fast sensing. In a time slot 1002, the cognitive radio base station or the cognitive radio terminal may determine whether the detected energy is greater than or equal to a threshold and perform fine sensing to verify the secondary terminal exists in the corresponding channel. Here, the secondary terminal may be the same level of a user that is used in another system. For example, the secondary terminal does not have priority for the channel. Accordingly, the existing allocated cognitive radio terminal and the secondary terminal may be allocated to a single channel while maintaining a protocol therebetween.

As the same as where a cognitive radio terminal having priority for use of the channel, that is, a primary terminal exists in the channel, the cognitive radio terminal may inform the cognitive radio base station about the fine sensing result using a closest common control channel 1005. The cognitive radio base station may receive the code-based fine sensing result from the cognitive radio terminal via the common control channel 1005. Accordingly, a cognitive radio communication enable the cognitive radio base station to quickly recognize the existence of the secondary terminal in the channel.

The cognitive radio base station may verify the existence of the secondary terminal and determine the pre-allocated cognitive radio terminal and the secondary terminal may share the corresponding channel. For this, the common control channel information may be updated by adjusting parameters associated with a common control channel region, a bandwidth size, and the like. The updated common control channel information may be transferred to all the cognitive radio terminals via a FCH and a BCH of a subsequent common control channel 1004. For example, the cognitive radio base station may switch to another channel for transmitting common control channel information at a closest point in time among the remaining channels excluding the allocated channel to thereby broadcast the updated common control channel information via the switched channel.

All the cognitive radio terminals included in the network may receive the updated common control channel information to thereby be aware of changes made in the entire frame structure and to share the channel where the secondary terminal exists. For example, a cognitive radio communication system adopting the cognitive radio communication method may classify or share the secondary terminal and the previously allocated cognitive radio terminal to thereby maintain a QoS and perform communication via a corresponding channel without causing interference between cognitive radio terminals. A distributed protocol such as CSMA/CA may be used to share the channel.

According to examples described above, a cognitive radio communication method may dynamically allocate common control channel information to thereby quickly recognize a terminal existing in a channel and may inform terminals connected to a multi-channel environment using the common control channel information to thereby effectively recycle channels.

Also, a cognitive radio communication method may variably allocate the bandwidth of a channel to be appropriate for a multi-channel environment and may also adjust the bandwidth of common control channel information in correspondence to the variably allocated bandwidth of the channel to thereby quickly and accurately use frequency resources.

In addition, a cognitive radio communication method may stably report the existence of a primary terminal or a secondary terminal using a code-based random access scheme for reporting without additional reporting, or with broadcasting common control channel information.

A cognitive radio communication method also may commonly use transmission of information for communication setting and communication control between a non-licensed equipment and system operating in multiple modes, using common control channel information.

The methods described above including the cognitive radio communication method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio communication method comprising: maintaining a plurality of channels to transmit common control channel information at different points in time respectively; determining, by a cognitive radio base station, a common control channel information and broadcasting the common control channel information via the plurality of channels from a first point in time among the different points in time; receiving, by a cognitive radio terminal, the common control channel information and requesting a channel allocation from the cognitive radio base station based on the received common control channel information; and allocating, by the cognitive radio base station, a first channel with respect to the cognitive radio terminal in response to the channel allocation request.

2. The method of claim 1, further comprising:
broadcasting, by the cognitive radio base station, the common control channel information;
recognizing, by the cognitive radio base station, the existence of a primary terminal in the allocated first channel,
wherein, where the primary terminal exists in the first channel, the broadcasting comprises:
updating the common control channel information to verify a second channel for transmitting the common control channel information at a second point in time closest to the first point in time; and
broadcasting the common control channel information via the plurality of channels excluding the first channel from the second point in time, where the second channel is verified.

3. The method of claim 2, wherein the recognizing comprises:
detecting, by the cognitive radio base station, the energy in the allocated first channel using a fast sensing scheme; and
determining whether the detected energy is greater than or equal to a threshold.

4. The method of claim 3, wherein the recognizing further comprises:
performing fine sensing for the allocated first channel where the detected energy is greater than the threshold.

5. The method of claim 2, wherein the recognizing comprises:
detecting, by the cognitive radio terminal, the energy in the allocated first channel using a fast sensing scheme to determine whether the detected energy is greater than or equal to a threshold; and
transmitting, by the cognitive radio terminal, the fast sensing result to the cognitive radio base station based on the fast sensing result.

6. The method of claim 5, wherein the cognitive radio terminal transmits the fast sensing result to the cognitive radio base station using a code-based random access scheme.

7. The method of claim 5, wherein the recognizing further comprises:
performing, by the cognitive radio terminal, fine sensing for a corresponding channel depending on the fast sensing result; and
transmitting, by the cognitive radio terminal, the fine sensing result to the cognitive radio base station.

8. The method of claim 7, wherein the cognitive radio terminal transmits the fine sensing result to the cognitive radio base station using a code-based random access scheme.

9. The method of claim 1, wherein the common control channel information comprises at least one of frame synchronization information, format information of a common control channel, broadcast information, sensing interval information, access request information, and access grant information.

10. The method of claim 1, wherein the allocating of the first channel comprises:
verifying, by the cognitive radio base station, a bandwidth of a channel to be used by the cognitive radio terminal; and
changing, by the cognitive radio base station, the bandwidth of the first channel to the verified bandwidth,
wherein the common control channel information is broadcast based on the changed bandwidth of the channel.

11. The method of claim 10, wherein the changing of the bandwidth of the first channel comprises changing the bandwidth of the first channel by bonding at least two channels among the plurality of channels.

12. A cognitive radio communication method comprising:
maintaining a plurality of channels;
determining common control channel information to broadcast, for each of the channels, the common control channel information at different points in time, respectively;
receiving a channel allocation request for the channels from a plurality of cognitive radio terminals based on the broadcast common control channel information; and
allocating, in response to the received channel allocation request, the plurality of channels to the plurality of cognitive radio terminals, respectively.

13. The method of claim 12, further comprising:
recognizing a signal of a primary terminal in a particular channel among the plurality of channels; and
updating the common control channel information to broadcast the updated common control channel information via the remaining channels excluding the particular channel, where the signal of the primary terminal is recognized in the particular channel,
wherein the remaining channels excluding the particular channel, are allocated to the plurality of cognitive radio terminals, respectively, based on the updated common control channel information.

14. The method of claim 13, wherein the recognizing of the signal comprises performing fast sensing and fine sensing for the particular channel to recognize the signal of the primary terminal.

15. The method of claim 13, wherein the recognizing of the signal comprises receiving the fast sensing result from a cognitive radio terminal allocated to the particular channel and receiving the fine sensing result from the plurality of cognitive radio terminals in correspondence to the fast sensing result to recognize the signal of the primary terminal according to the received fine sensing result.

16. The method of claim 15, wherein the plurality of cognitive radio terminals transmit the fine sensing result using a code-based random access scheme.

17. A cognitive radio communication method comprising:
recognizing the existence of a primary terminal according to a fast sensing scheme to transmit first information according to the fast sensing scheme to a cognitive radio base station;
transmitting, to the cognitive radio base station, in response to a request from the cognitive radio base station receiving the first information, second information that includes a fine sensing result that is obtained by performing fine sensing for a signal of the primary terminal according to a fine sensing scheme; and
receiving, from the cognitive radio base station, common control channel information that is updated based on the second information, to request the cognitive radio base station for allocation of an available channel among a plurality of channels based on the received common control channel information.

18. The method of claim 17, wherein the first information or the second information is transmitted to the cognitive radio base station using a code-based random access scheme.

19. A cognitive radio communication method comprising:
maintaining a plurality of channels;
determining common control channel information to broadcast, for each of the channels, the common control channel information to a plurality of cognitive radio terminals at different points in time, respectively, and to allocate the plurality of channels to the plurality of cognitive radio terminals, respectively, in response to a request from the cognitive radio terminals receiving the common control channel information;
recognizing, from the plurality of channels allocated to the plurality of cognitive radio terminals, a channel where a secondary terminal exists; and
separately communicating with the secondary terminal and a cognitive radio terminal allocated to a corresponding channel via the corresponding channel.

20. The method of claim 19, wherein the recognizing of the channel comprises:
updating the common control channel information; and
switching to a channel for transmitting the common control channel information at a closest point in time, among the remaining channels excluding the corresponding channel, to broadcast the updated common control channel information.

21. A non-transitory computer-readable recording medium storing a program configured to cause a cognitive radio communication network to: maintain a plurality of channels to transmit common control channel information at different points in time respectively; determine, by a cognitive radio base station, a common control channel information and broadcast the common control channel information via the plurality of channels from a first point in time among the different points in time; receive, by a cognitive radio terminal, the common control channel information and request a channel allocation from the cognitive radio base station based on the received common control channel information; and allocate, by the cognitive radio base station, a first channel with respect to the cognitive radio terminal in response to the channel allocation request.

* * * * *